(12) United States Patent
Gabriel et al.

(10) Patent No.: US 6,682,458 B2
(45) Date of Patent: Jan. 27, 2004

(54) METHOD FOR OPERATING A VEHICLE AND A VEHICLE WHICH INCORPORATES THE METHOD

(75) Inventors: David Crist Gabriel, Royal Oak, MI (US); James Paul McCarthy, Milford, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/064,175

(22) Filed: Jun. 19, 2002

(65) Prior Publication Data
US 2003/0236149 A1 Dec. 25, 2003

(51) Int. Cl.⁷ ............................. F16H 59/64; F01P 5/14
(52) U.S. Cl. ..................................... 477/98; 123/41.15
(58) Field of Search .......................... 477/97, 98, 902; 701/54, 55, 56; 123/41.15, 378

(56) References Cited

U.S. PATENT DOCUMENTS

| 4,313,080 A | 1/1982 | Park |
| 4,473,045 A | 9/1984 | Bolander et al. |
| 4,945,878 A | 8/1990 | Daly et al. |
| 4,977,862 A | 12/1990 | Aihara et al. |
| 4,998,449 A * | 3/1991 | Baba et al. .................... 477/98 |
| 5,065,705 A | 11/1991 | Fujimoto et al. |
| 5,094,192 A | 3/1992 | Seiffert et al. |
| 5,133,303 A | 7/1992 | Umehara et al. |
| 5,217,085 A | 6/1993 | Barrie et al. |
| 5,237,975 A | 8/1993 | Betki et al. |
| 5,255,733 A | 10/1993 | King et al. |
| 5,291,960 A | 3/1994 | Brandenburg et al. |
| 5,343,970 A | 9/1994 | Severinsky |
| 5,446,362 A | 8/1995 | Vanek et al. |
| 5,555,871 A | 9/1996 | Gopp et al. |
| 5,678,760 A | 10/1997 | Muso et al. |
| 5,826,671 A | 10/1998 | Nakae et al. |
| 5,830,106 A * | 11/1998 | Abe ............................ 477/98 |
| 5,857,162 A * | 1/1999 | Vukovich et al. ......... 477/98 X |
| 5,875,414 A | 2/1999 | Tsutsumi |
| 5,880,574 A | 3/1999 | Otsuka et al. |
| 6,026,921 A | 2/2000 | Aoyama et al. |
| 6,036,053 A | 3/2000 | Simmons et al. |
| 6,088,631 A * | 7/2000 | Kuehn et al. ............. 477/98 X |
| 6,093,974 A | 7/2000 | Tabata et al. |
| 6,140,780 A | 10/2000 | Oshima et al. |

FOREIGN PATENT DOCUMENTS

JP          60011761    *  1/1985   .................. 477/98

* cited by examiner

*Primary Examiner*—Roger Pang
(74) *Attorney, Agent, or Firm*—Brooks Kushman P.C.; Carlos Hanze

(57) ABSTRACT

A method and an apparatus 12 which uses or calculates a temperature gradient of a portion 16 of a vehicle 10 to determine a value equal to or representative of a time before a maximum allowable operating temperature is reached by the portion 16. If the value is less than a certain threshold, the apparatus 12 reduces the operating speed of the portion 16 and, in one embodiment, provides a warning signal to an operator of the vehicle 10.

15 Claims, 1 Drawing Sheet

METHOD FOR OPERATING A VEHICLE AND A VEHICLE WHICH INCORPORATES THE METHOD

BACKGROUND OF INVENTION

1. Field of the Invention

The present invention generally relates to a method and an assembly for vehicle thermal management and to a vehicle which incorporates the method and assembly and more particularly, to a method and an assembly which measures the temperature of a vehicular component or assembly in order to create or select a thermal change function or thermal gradient, which uses the thermal change function or thermal gradient to create a time to temperature value which is approximately equal to the time in which a predetermined maximum operating temperature will be reached by the vehicular component or assembly, and which performs a certain action in response to the approximated time to temperature value.

2. Background of the Invention

A motor vehicle includes many selectively movable and interconnected components and assemblies which are adapted to operate within a certain respective temperature range and which are respectively associated with a maximum operating temperature that should not be exceeded.

Current thermal management strategies utilize temperature sensors for providing positive indications only when the respective temperature of the various monitored assemblies and components actually exceeds a certain respective threshold value.

While the foregoing information is somewhat useful to the operator of the vehicle, preemptive action is often not possible in advance of the actual occurrence of this undesirable situation. Accordingly, once the positive indication is provided, the operator is required to stop or immediately disable the vehicle even if it is not very desirable to do so (e.g., such as when a hybrid-electric vehicle is positioned upon the side of a hill or mountain), in order to cool the components.

Further, conventional strategies require an operator of the vehicle to perform some action and do not automatically or dynamically (e.g., without operator intervention) modify the operation of the vehicle in order to preemptively regulate the temperature of the monitored items in order to correct or compensate for such an undesired operation, while concomitantly reducing the likelihood that an item will meet/exceed its maximum operating temperature.

The present invention overcomes these drawbacks in a new and novel fashion and controls the operation of certain vehicular items, such as and without limitation a drivetrain or transmission assembly, by the use of active or dynamic preemptive regulation.

SUMMARY OF INVENTION

A method and an apparatus which overcomes some or all of the various previously delineated drawbacks of prior vehicular operating strategies and techniques. Advantageously, the method and assembly dynamically and preemptively provides a warning to a vehicular operator that one or more vehicular items may become undesirably heated. The method and assembly of the present invention automatically and dynamically regulates the operating temperature of a vehicular item, thereby substantially reducing the likelihood of undesired operation.

In accordance with a first aspect of the present invention, a thermal control assembly is provided which determines whether a certain portion of a vehicle which is selectively operable at a certain speed will exceed a certain operating temperature within a certain period of time and which reduces the likelihood of the portion of the vehicle exceeding the certain operating temperature. Particularly, the assembly includes at least one sensor which is coupled to the certain portion of the vehicle and which provides a first temperature of the certain portion of the vehicle at a first time and a second temperature of the certain portion of the vehicle at a second time, and a controller which is coupled to the at least one sensor, which receives the first and second temperatures, which uses the first and second temperatures to calculate a time period, and which decreases the certain speed of the portion of the vehicle when the calculated time period is less then the certain period of time.

In accordance with another aspect of the present invention, a vehicle is provided having: a transmission assembly having a certain maximum allowable operating temperature and being operable at a certain speed; at least one sensor which is coupled to the transmission assembly, which measures a first, a second, and a third temperature of the transmission assembly; and a controller which is coupled to the at least one sensor and to the transmission assembly, which receives the first, second, and third temperatures, which storably contains a thermal gradient function, which uses the second and third temperatures and the thermal gradient function to ascertain a time in which the transmission assembly will exceed the certain maximum allowable operating temperature only when the first temperature exceeds a certain value, which storably contains a time value, which compares the calculated time to the time value and, based upon this comparison, selectively reduces the speed of the transmission assembly, effective to reduce the likelihood of the transmission assembly from having a temperature which exceeds the maximum allowable operating temperature.

In accordance with yet another aspect of the present invention, a method is provided for operating a vehicle having a torque producing assembly which may be operated at a certain speed. Particularly, the method includes the steps of: defining a maximum temperature value of the torque producing assembly; monitoring a change in temperature of the torque producing assembly; using the monitored change in temperature to ascertain the amount of time in which the maximum temperature value will be achieved; and reducing the certain speed of the torque producing assembly when the ascertained amount of time is less than a certain value. These and other features and advantages of the present invention will become apparent from a reading of the following detailed description of the preferred embodiment of the invention and by reference to the following drawings.

DETAILED DESCRIPTION

Figure 1:
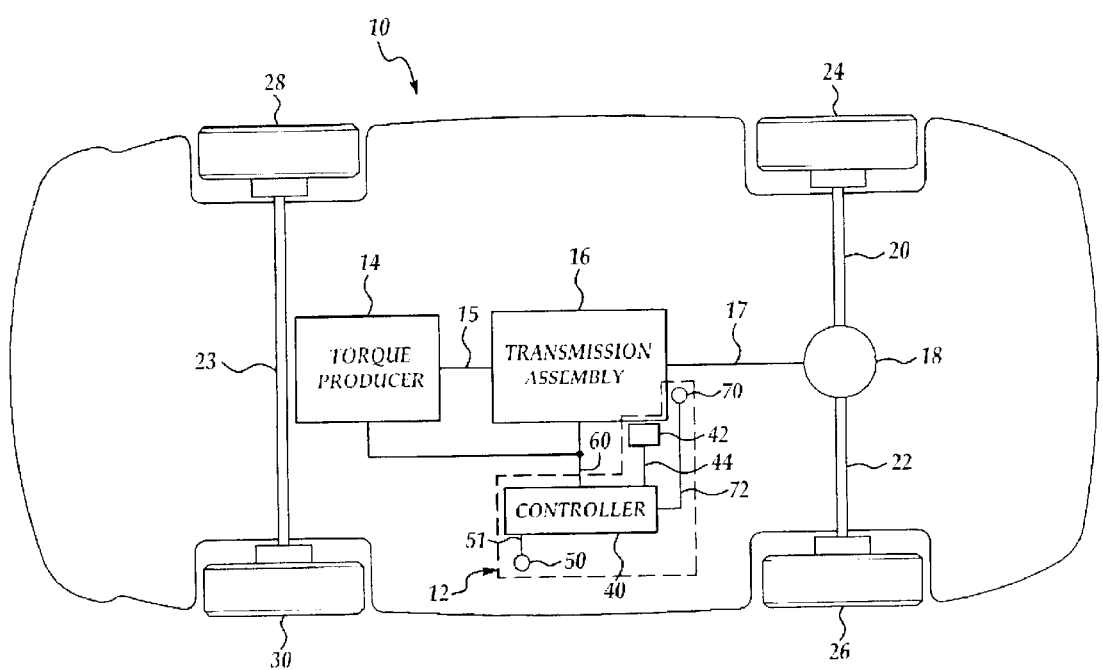
FIG. 1 is a block diagram of a vehicle incorporating an assembly which is made in accordance with the teachings of the preferred embodiment of the invention.

Referring now to FIG. 1, there is shown a vehicle 10 having a thermal control assembly 12 which is made in accordance with the teachings of the preferred embodiment of the invention. It should be realized that only the relevant portions of the vehicle 10 are shown within FIG. 1 and that the present invention is not limited for use with a particular type of vehicular configuration, such as that which is shown by way of example and without limitation in FIG. 1. Rather, the present invention may be applied to a wide variety of dissimilar vehicles, such as by way of example and without limitation, a hybrid electric vehicle, and to non-vehicular assemblies, components, and apparatuses. The following description is therefore only meant to explain the pertinent features of the present invention and is not intended to limit the scope or the use of the present invention to a particular type of vehicle or to a particular type of non-vehicular apparatus and/or assembly.

As shown, vehicle 10 includes a torque generator or producer 14, such as and without limitation an internal combustion engine. As earlier indicated, torque generator 14 may comprise a fuel cell, an electric motor, or substantially any other type of energy source in combination with a selectively movable member. The generator 14 or torque producer includes or is integrally formed with or is attached to a selectively movable member 15 which produces torque in response to the energization of or the sourcing of energy from the torque producer 14. The vehicle 10 further includes a transmission or drivetrain assembly 16 having a selectively movable output shaft 17. The transmission assembly 16 is coupled to the crankshaft 15 and transfers or couples the movement of (the torque emanating from) the crankshaft 15 to the output shaft 17. The vehicle 10 further includes a differential assembly 18 which is coupled to the output shaft 17, two half-shafts or rear axles 20, 22 which are each coupled to the differential assembly 18, and a front axle 23. The vehicle 10 further includes a first pair of wheels 24, 26 which are respectively coupled to the axles or half-shafts 20, 22 and a second pair of wheels 28, 30 which are respectively coupled to the front axle 23. As should be realized by those of ordinary skill in the art, the differential assembly 18 receives the torque from the selectively moving member 17 and distributes this torque to the wheels 24, 26 by use of the axles or half-shafts 20, 22, thereby allowing the vehicle 10 to be selectively propelled and maneuvered.

Assembly 12 includes a controller 40 which is operable under stored program control and at least one temperature sensor 42 which is coupled to the controller 40 by the use of bus 44 and which operatively resides upon or is placed in close proximity to the transmission assembly 16. Other sensors may be used to monitor the temperature of other components, assemblies, or items of the vehicle 10 and, more particularly, these sensors are used by the controller 40 in substantially the same manner as the sensor 42 is used and described below. Assembly 12 also includes a selectively energizable positive feedback assembly or portion 50 which is coupled to the controller 40 by bus 51 and which may comprise a selectively energizable light and/or a selectively energizable audio generator. Controller 40 is also controllably coupled to the torque producer 14 and to the transmission assembly 16 by bus 60. Assembly 12 also includes a speed sensor 70 which is coupled to the controller 40 by bus 72 and which measures the speed of the transmission assembly 16 and which continually provides the measured speed to the controller 40 by the use of bus 72. It should be realized that assembly 12 may be selectively and retrofittably placed within vehicle 10 or provided as original equipment within the vehicle 10.

The operation of the assembly 12 will now be discussed in greater detail below. However, it should be realized that while the discussion below describes the combined the use of sensor 42 and controller 40 to monitor the temperature of the transmission assembly 16 and to preemptively and automatically or dynamically modify (e.g., without operator intervention) the operation of the transmission assembly 16 in accordance with the monitored temperature, it should be realized that other sensors (not shown) may be used in the same manner to monitor the temperature of such other components, assemblies, and items such as the torque generator 14, and that the controller 40 also may preemptively and automatically or dynamically regulate the temperature and operation of these other components, assemblies, and items in substantially the same manner as the controller 40 automatically and preemptively regulates the temperature of the transmission assembly 16.

In operation, a certain desired maximum operating temperature is known for the transmission assembly 16 and this maximum operating temperature is stored within the controller 40. By way of the example and without limitation, this desired maximum operating temperature may be obtained from the manufacturer's data sheet for the transmission assembly 16 or obtained through experimentation in which the transmission assembly 16 is operated at a variety of increasing temperatures until the transmission assembly 16 ceases to function or ceases to function in a desired manner. The highest temperature at which the transmission assembly 16 continues to function is defined as the maximum operating temperature or the highest desired maximum operating temperature. Further, in one non-limiting embodiment of the invention, the monitored component, assemblies, or item (e.g., the transmission assembly 16) is operated at variety of speeds and the manner or rate at which the temperature of the transmission assembly 16 increases over time at each of the operating speeds is identified and stored within the controller 40, thereby forming a temperature gradient or temperature function for each such tested speed.

As the vehicle 10 is operated, the controller 40 continually reads or acquires temperature data from the sensor 42 and determines the speed at which the component (e.g., the transmission assembly 16) is operating by use of speed sensor 70, and the time over which the component has been operated at that speed. Once the temperature exceeds a first threshold value (e.g., by way of example and without limitation a temperature which is equal to about one fourth to one half of the allowable maximum operating temperature) or the operating time during which the item (transmission assembly 16) continually operates exceeds a certain value, the controller 40 accesses the temperature gradient for that speed and uses the selected temperature gradient (uniquely associated with that currently sensed operating speed) to determine the time in which the desired maximum operating temperature will be reached. That is, the current sensed speed is used to select a temperature gradient and the currently sensed temperature is compared to the maximum allowable operating temperature. The time in which the temperature of the transmission assembly 16 will increase by this difference is estimated by the rate of temperature associated with or provided by the temperature gradient. If the currently measured operating speed is not associated with a particular temperature gradient function, the controller 40 selects a stored temperature gradient function which is uniquely associated with a speed which is closest to the current operating speed. At a certain period of time before such desired maximum temperature value is reached (e.g., the certain period of time being less than some stored threshold value, for example about twenty minutes), the controller 40 automatically causes the torque produced by the transmission assembly 16 to be reduced, thereby proactively, automatically, and preemptively preventing the transmission assembly 16 from reaching the desired maximum temperature value. Such automatic speed or torque reduction may occur due to a command which is generated by the controller 40 and placed on the bus 60 and which reduces the amount of energy produced by the torque generator 14 or which causes the transmission assembly 16 to have a different gear ratio. The controller 40 may also selectively energize apparatus 70 (which may comprise a selectively energizable light or audio generator), thereby providing a positive indication to the vehicular operator of such preemptive control. Such a positive indication may also include tactile feedback.

In a second alternate embodiment of the invention, the controller 40 uses the continually received temperatures, emanating from the temperature sensors 42, to dynamically form a temperature gradient function by a conventional mathematical curve fitting technique. The time to reach the maximum operating temperature value is then mathematically extrapolated from the dynamically created temperature gradient function and the controller 40 then functions in the previously delineated manner.

It is to be understood that the invention is not limited to the exact construction and method which has been delineated above, but that various changes and modifications may be made without departing from the spirit and the scope of the inventions as are delineated in the following claims. It should further be appreciated that the method may use other attribution of components/apparatuses, such as torque or power, in combination with the sensed temperatures to allow the foregoing benefits to be achieved.

What is claimed is:

1. A thermal control assembly comprising at least one sensor which is coupled to a certain portion of a vehicle and which provides a first temperature of said certain portion of said vehicle at a first time and a second temperature of said certain portion of said vehicle at a second time; and a controller which is coupled to said at least one sensor, which receives said first and second temperatures, which uses said first and second temperatures to calculate a time period, and which decreases a certain speed of said portion of said vehicle when said calculated time period is less then a certain period of time.

2. The assembly of claim 1 wherein said certain portion of said vehicle comprises a transmission assembly.

3. The assembly of claim 2 wherein said controller stores a temperature gradient function and uses said stored temperature gradient in combination with said first and second temperature values to calculate said time period.

4. The assembly of claim 2 wherein said controller dynamically creates a thermal gradient function by use of said first and second temperature values.

5. The assembly of claim 4 wherein said controller dynamically creates said thermal gradient function by curve fitting said first and second temperature values.

6. The assembly of claim 2 wherein said assembly further comprises a selectively energizable light which is coupled to said controller and which is energized by said controller when said calculated time period is less than said certain period of time.

7. The assembly of claim 2 wherein said assembly further comprises a selectively energizable audio generator which is energized by said controller when said calculated time period is less than said certain period of time.

8. The assembly of claim 1 wherein said controller calculates said time period only when the temperature of said certain portion of said vehicle exceeds a certain threshold value.

9. The assembly of claim 2 wherein said controller calculates said time period only when said certain portion of said vehicle has been continualy operating for a certain predetermined period of time.

10. A vehicle comprising a transmission assembly having a certain maximum allowable operating temperature and being operable at a certain speed; at least one sensor which is coupled to said transmission assembly, which measures a first, a second, and a third temperature of said transrmission assembly; and a controller which is coupled to said at least one sensor and to said transmission assembly, which receives said first, second, and third temperatures, which storably contains a thermal gradient function, which uses said second and third temperatures and said thermal gradient function to ascertain a calculated time in which said transmission assembly will exceed said certain maximum allowable operating temperature only when said first temperature exceeds a certain value, which storably contains a time value, which compares said calculated time to said time value and, based upon this comparison, selectively reduces the speed of said transmission assembly, effective to reduce the likelihood of said transmission assembly from having a temperature which exceeds said maximum allowable operating temperature.

11. The vehicle of claim 10 wherein said controller ascertains said time in which said transmission assembly will exceed said certain maximum allowable operating temperature only after said transmission has been continually operated for a certain period of time.

12. The assembly of claim 10 wherein said vehicle further includes a selectively energizable warning assembly which is coupled to said controller and which is energized when said speed of said transmission assembly is reduced by said controller.

13. The assembly of claim 12 wherein said selectively energizable warning assembly comprises a selectively energizable light.

14. The assembly of claim 12 wherein said selectively energizable warning assembly comprises a selectively energizable audio generator.

15. The vehicle of claim 11 wherein said controller dynamically calculates said temperature gradient function.

\* \* \* \* \*

UNITED STATES PATENT AND TRADEMARK OFFICE
CERTIFICATE OF CORRECTION

PATENT NO. : 6,682,458 B2
DATED : January 27, 2004
INVENTOR(S) : Gabriel et al.

It is certified that error appears in the above-identified patent and that said Letters Patent is hereby corrected as shown below:

Title page,
Item [54], Title, should read:
-- METHOD AND ASSEMBLY FOR VEHICLE THERMAL MANAGEMENT --

Signed and Sealed this

Eighteenth Day of May, 2004

JON W. DUDAS
*Acting Director of the United States Patent and Trademark Office*